United States Patent Office 3,234,245
Patented Feb. 8, 1966

3,234,245
PROCESS FOR THE MANUFACTURE OF UNSATURATED STEROIDS
Albert Wettstein, Riehen, and Georg Anner, Karl Heusler, and Peter Wieland, Basel, Switzerland, assignors to Ciba Corporation, New York, N.Y., a corporation of Delaware
No Drawing. Filed July 8, 1963, Ser. No. 293,284
Claims priority, application Switzerland, July 11, 1962, 8,332/62, 8,333/62
13 Claims. (Cl. 260—397.45)

Steroids substituted in position 6 by a halogen atom such as fluorine or chlorine atom, more especially derivatives of progesterone and 6-fluorocorticoids, for example 6-fluoroprednisone, 6-fluoroprednisolone, 6-fluoro-16α-methylprednisolone and others, are of great importance by virtue of their special pharmocological properties. The introduction of a fluorine atom in position 6 is particularly easy when the starting material used is a 5:6-unsaturated steroid, for example by epoxidation to the 5:6α-epoxide and scission with hydrofluoric acid or boron trifluoride, or by addition of bromine fluoride (prepared from bromacetamide and hydrofluoric acid) on to the 5:6-double bond.

This is why $\Delta^5$-steroids have today acquired a great importance, and new methods of preparation of these compounds which show any advantage as compared to those of the prior art are of great interest. The present invention is directed to such a new process, which starts from $\Delta^{4:6}$-steroid dienes. These starting compounds are readily accessible from $\Delta^4$-3-oxo-steroids or from saturated 3-ketones and the present process is therefore especially advantageous in connection with the introduction of the 5,6-double bond into saturated compounds or the formation of it out of a 4,5-double bond. It is true that it is known how to introduce a 4:5-double bond into a 3-ketone of the allo series and on the other hand how to convert a $\Delta^4$-ketone by enol acetylation and subsequent reduction with sodium borohydride into $\Delta^5$-hydroxysteroids. However, the enol acetylation has to be carried out under strongly acidic conditions and when acid-sensitive compounds are involved, such as those having, e.g., a dihydroxy-acetone side chain, undesirable side reactions occur and the yields are therefore very unsatisfactory. The present process avoids strongly acidic conditions and it can therefore very well be used also with substances sensitive to acids.

The process of the present invention consists in reducing a $\Delta^{4,6}$-3-oxo-steroid under almost neutral conditions with zinc and, if desired, isomerizing the thus-obtained $\Delta^5$-3-ketone to the $\Delta^4$-3-ketone or reducing it with a complex metal hydride to the $\Delta^5$-3-hydroxy-steroid.

While it is known that $\Delta^{4:6}$-3-ketones of the steroid series can be reduced to $\Delta^5$-3-ketone with molecular proportions of an alkali metal in liquid ammonia, this process is not simple to perform on an industrial scale and there are obtained as by-products substantial amounts of saturated ketone. In addition, other reducible groups, more especially oxo groups, are simultaneously reduced. The present process, on the other hand, is particularly simple to perform and may primarily be used also when the starting material contains sensitive substituents, for example keto groups and acid-sensitive groupings. It is possible without difficulty, for example, to reduce $\Delta^{4:6}$-3:20-dioxopregnadiene or $\Delta^{4:6}$-3:17-dioxoandrostadiene without requiring protection for the 20-oxo or 17-oxo group. This is of special value in the case of corticoids having a 17α:21-dihydroxy-20-oxo side-chain.

According to the present process the $\Delta^{4:6}$-3-oxo-steroids are reduced with zinc under conditions such that the resulting $\Delta^5$-3-oxosteroids are not rearranged into the more stable $\Delta^4$-3-oxosteroids, that is, as mentioned above, under almost neutral conditions. The reduction is performed with zinc, for example in the form of zinc dust, which may be activated by a short treatment with an acid, for example acetic, propionic or sulfuric acid, or a zinc alloy, such as a zinc-copper alloy, amalgamated zinc or the like. The reduction is generally performed in an alcoholic medium, advantageously in an alcohol containing 1 to 5% of water, such as methanol, ethanol, propanol, ethyleneglycol or the like. The activation of zinc may alternatively be carried out in the reaction medium itself, for example by adding a small amount (for example 2 to 10%) of a carboxylic acid to the alcohol; in this concentration weak acids, such as acetic, propionic, butyric acid or the like are incapable of causing rearrangement of the $\Delta^5$-ketones to the isomeric $\Delta^4$-3-ketones. The reduction according to the invention is advantageously performed at a moderately elevated temperature, for example between 45 and 100° C.

The subsequent optional reduction with a complex metal hydride, more especially with a complex boron or aluminium hydride, such as sodium borohydride, lithium-aluminium hydride or a lithium trialkoxy-aluminium hydride, is advantageously performed in an anhydrous or a water-containing alcohol, for example methanol, ethanol, isopropanol, or in another water-miscible solvent, such as tetrahydrofuran, dioxane, glycol dimethyl ether, diethyleneglycol dimethyl ether or the like. When a borohydride and a short reaction time and/or a low temperature (for example ranging from +5 to —30° C.) is used, the protection of oxo groups, for example in position 11, 17 and/or 20, may be dispensed with also in this case since the keto group in a $\Delta^5$-3-oxosteroid is very rapidly reduced (at 0° C., for example, within as short a time as 5 to 30 mintes). When the complex metal hydride used is lithium-aluminium hydride or a lithium trialkoxy-aluminium hydride, other oxo groups are reduced at the same time.

The $\Delta^5$-3-oxo- compounds obtained by reduction of $\Delta^{4:6}$-3-ketones may also be rearranged by treatment with acids or bases to $\Delta^4$-3-ketones, for example by heating with glacial acetic acid, by treatment with a mineral acid such as hydrochloric, sulfuric, a sulfonic acid such as para-toluenesulfonic acid, in an alcohol, acetone, dioxane or the like, or by treatment with a basic agent, such as a carbonate or hydroxide of an alkali metal, an alkali metal acylate such as potassium acetate or sodium acetate, or with alumina.

As starting materials in the present process there are used $\Delta^{4:6}$-3-ketones, e.g., such of the chloestane, stigmastane, pregnane or androstane series which may contain in positions 9, 11, 12, 14, 15, 16, 17, 20 and 21 further substituents, such as free or esterified hydroxyl groups, oxo groups, alkyl groups, such as lower alkyl groups, especially methyl groups, and/or halogen atoms, such as fluorine or chlorine atoms. Specifically there may be mentioned $\Delta^{4:6}$-3:20-dioxopregnadienes, such as the $\Delta^{4:6}$-3:20-dioxo-17α:21-dihydroxypregnadienes which may contain, for example in position 11, an oxo group or a free or esterified hydroxyl group or which may be unsaturated in position 9:11; these compounds may also contain a methyl group in position 16.

Particularly valuable starting materials are $\Delta^{4:6}$-3:20-dioxo-17α-hydroxy-21-acetoxypregnadienes that contain a formyloxy group in position 11α. As a matter of fact, it has been found that this formyloxy group can be hydrolyzed without at the same time also hydrolyzing the 21-acyloxy group. The selective hydrolysis can be achieved, for example, by treating the steroid with an alkali metal carbonate in an aqueous solvent such as water-containing dioxane, methanol, tetrahydrofuran or the like, or by adsorption of the 11α-formyl-oxy-21-acetoxypregnane compound on alumina and subsequent elution, for example, with ethyl acetate. This selective hydrolysis makes it possible to esterify the 11α-hydroxyl group afterwards with a sulfonyl chloride and, by elimination of the sulfonic acid, to arrive at 9:11-unsaturated compounds which themselves can be converted in known manner into 9α-fluoro-11β-hydroxysteroids.

The $\Delta^{4:6}$-steroid dienes used as starting compounds can be prepared according to methods known in the art. For instance $\Delta^4$-3-oxo-steroids are brominated in 6-position and the 6-bromo-compounds are dehydrobrominated or $\Delta^4$-3-oxo compounds are treated with a dehydrogenating agent, such as e.g. manganese dioxide or a quinone such as chloranil or 2,3-dichloro-5,6-dicyanobenzoquinone It is also known that when 2,4-dibromo-steroids are dehydrobrominated there are formed besides the 1,4-dienes also small quantities of 4,6-dienes; this occurs especially when the reaction mixture contains a certain amount of free hydrobromic acid. The dehydrobromination is generally carried out in dialkylformamides or dialkyl acetamides, preferably at temperatures between about 100–150° C., and the reaction is generally terminated in the course of a few hours. It has now surprisingly been found that the above mentioned dehydrobromination of 2,4-dibromo-steroids can also be conducted in such a way as to have the 4:6 dienes formed as the main product instead of the 1:4 dienes. This is achieved by carrying out the dehydrobromination of the 3-oxo-5-H-2:4-dibromosteroids in a dialkylamide derived from an alkanoic acid of at most 2 carbon atoms, if desired, with addition of a lithium halide, at temperatures between 20 and 100° C.

When the dehydrobromination is carried out in the temperature range mentioned above, the speed of the reaction is manifestly reduced, but it also takes another course: whereas above 100° C. the main product is the $\Delta^{1:4}$-3-ketone and only small quantities of the $\Delta^{4:6}$-3-ketone are produced, the ratio of the latter augments at lower temperatures and at about 60° C. it predominates.

The dehydrobromination is carried out with dialkyl of formic or acetic acid, for example with dimethylformamide, diethylformamide, dimethylacetamide or diethylacetamide, advantageously in the presence of a lithium halide, for example lithium chloride or bromide. If desired, there may be further added to the reaction batch an alkali metal carbonate or alkaline earth metal carbonate, for example lithium carbonate or calcium or strontium carbonate. The reaction temperature may be up to 100° C., but it is advantageously below 80° C., more especially so when a lithium halide is present. At about 60° C. the dehydrobromination takes about 20 to 30 hours and at 20 to 25° C. as long as several days. Since the ratio of $\Delta^{1:4}$-diene:$\Delta^{4:6}$-diene is roughly identical at 60 and 20° C., it is of special advantage to use a temperature from 40 to 60° C., at which the reaction takes about 20 to 60 hours. The reaction products are advantageously purified by chromatography on alumina or silica gel.

The following examples illustrate the process of the invention.

*Example 1*

A solution of 463 mg. of 6-dehydrotestosterone propionate in 45 ml. of absolute ethanol is mixed with 4.5 ml. of water and about 5 g. of activated zinc dust, and the whole is stirred for 30 minutes at the boil. (To activate the zinc dust it is previously shortly treated with 2 N-sulfuric acid, then washed neutral with water, and washed with acetone and then with alcohol.) On expiry of the reaction time the solution no longer absorbs in ultraviolet light and contains $\Delta^5$-3-oxo-17β-propionyloxyandrostene. The reaction mixture is then mixed with a solution of 60 mg. of sodium borohydride in 1.0 ml. of water and stirred for 30 minutes at 0° C. 1.0 ml. of glacial acetic acid is then added, the unconsumed zinc is suctioned off, washed with alcohol and the filtrate is concentrated in a water-jet vacuum to about 10 ml., diluted with methylene chloride and washed with water. The dried methylene chloride solution is evaporated and yields 454 mg. of a crystalline residue which, on crystallization from acetone+ether, yields $\Delta^5$-3β-hydroxy-17β-propionyloxyandrostene melting at 153° C.

When this compound is reacted with propionic anhydride in pyridine overnight at room temperature, there is obtained, after conventional processing, $\Delta^5$-3β:17β-dipropionyloxyandrostene melting at 115–116° C.

*Example 2*

500 mg. of $\Delta^{4:6}$-3-20-dioxo-17α-hydroxy-21-acetoxypregnadiene are dissolved in 100 ml. of absolute alcohol; 5 ml. of water, 10 g. of zinc dust and 2 ml. of glacial acetic acid are added, and the batch is stirred for 30 minutes at 60° C. After this time the ultraviolet absorption has disappeared. The zinc is suctioned off, washed with 20 ml. of alcohol, the filtrate is diluted with 300 ml. of water, and the alcohol is distilled off in a water-jet vacuum at 35° C. After filtration there are obtained 508 mg. of crude $\Delta^5$-3:20-dioxo-17α-hydroxy-21-acetoxypregnene which melts at 174–176° C. after having been dissolved and reprecipitated from benzene and acetone ether. Optical rotation $[\alpha]_D^{25}=+84.5°$ (in chloroform). Infrared bands, inter alia, at 2.79, 5.70, 5.78 and 8.15μ. No ultraviolet absorption. When sodium hydroxide solution is added to an alcoholic solution of a specimen of the product, a strong maximum appears at 242mμ ($\epsilon$ about 15,000).

*Example 3*

A solution of 500 mg. of $\Delta^{4:6}$-3:20-dioxo-11α-formyloxy-16α-methyl-17α-hydroxy-21-acetoxypregnadiene in 50 ml. of alcohol, 2.5 ml. of water and 1 ml. of glacial acetic acid is mixed with 5.0 g. of zinc dust; the whole is stirred for 30 minutes at 60° C., then suction-filtered and rinsed with 15 ml. of alcohol and the filtrate is poured into 200 ml. of water. The alcohol is then distilled off in a water-jet vacuum. The precipitated reaction product is suctioned off, the filter residue is dissolved in methylene chloride, and the solution is dried and evaporated. When the crude product is triturated with benzene, there are obtained 362 mg. of $\Delta^5$-3:20-dioxo-11α-formyloxy-16α-methyl-17α-hydroxy-21-acetoxypregnane which melts at 188–190° C. after recrystallization from methylene chloride+actone+ether. Optical rotation $[\alpha]_D^{25}=+27°$ (in chloroform). Infrared bands, inter alia, at 2.80, 5.70, 5.78, 8.13 and 8.55μ.

A mixture of 150 mg. of this compound and 15 ml. of glacial acetic acid is heated for 30 minutes at 80° C., then evaporated in a water-jet vacuum, the residue is dissolved in methylene chloride, the solution is washed with sodium bicarbonate solution and with water, and the solution is dried and evaporated, to yield 145 mg. of a crude product which, on crystallization from methylene chloride+ether yields pure $\Delta^4$-3:20-dioxo-11α-formyloxy-16α-methyl-17α-hydroxy-21-acetoxypregnene melting at 173–175° C. Optical rotation $[\alpha]_D=+98.5°$. Ultraviolet maximum at 239mμ ($\epsilon=17,100$). Infrared bands, inter alia, at 2.74, 5.70, 5.79, 5.97, 6.17, 8.12, 8.43 and 8.51μ.

2 g. of $\Delta^4$-3:20-dioxo-11α-formyloxy-16α-methyl-17α-hydroxy-21-acetoxypregnene are added to a boiling solution of 100 mg. of pyridine hydrochloride in 100 ml. of benzene, 8 ml. of alcohol and 8 ml. of ethyl-orthoformate, and the whole is kept at the boil for another 30 minutes, then mixed with 1 ml. of pyridine, cooled, poured into dilute sodium chloride solution and three times extracted with benzene. The benzene solutions are washed with dilute sodium chloride solution, dried and evaporated under vacuum and the residue is recrystallized from a mixture of methylene chloride+ether+petroleum ether, to yield 1.64 g. of $\Delta^{3:5}$-3-ethoxy-11α-formyloxy-16α-methyl-17α-hydroxy-20-oxo-21-acetoxypregnadiene melting at 166–170° C. Optical rotation $[\alpha]_D^{25} = +97°$ (c.=0.883 in chloroform). Ultraviolet spectrum in absolute alcohol: $\lambda_{max.} = 241 m\mu$ ($\epsilon = 19,200$). Infrared spectrum (in methylene chloride): $2.79\mu$ (hydroxyl); 5.70 and $5.79\mu$ (acetate, formate, 20-ketone); 6.01 and $6.11\mu$ (diene); $8.16\mu$ (acetate) and $8.53\mu$ (formate).

A solution of 475 mg. of the resulting enol ether in 9 ml. of acetone is mixed with a solution of 100 mg. of sodium acetate in 3 ml. of water and stirred at about 0° C. in a hydrogenation apparatus in an atmosphere of fluoroperchlorate. After about 5 minutes the absorption of fluoroperchlorate ceases, whereupon the batch is poured into 50 ml. of water and extracted three times with methylene chloride. The organic solutions are extracted once with 50 ml. of a sodium bicarbonate solution of 5% strength and once with 50 ml. of water, dried and evaporated under vacuum. On recrystallization of the residue from methylene chloride+ether there are obtained 357 mg. of crystals which, after further recrystallization from acetone+ether and from methylene chloride+ether, melt at 190.5–192° C. The resulting $\Delta^4$-3:20-dioxo - 6$\beta$-fluoro-11$\alpha$-formyloxy-16$\alpha$-methyl-17$\alpha$-hydroxyl-21-acetoxy-pregnene displays in the infrared spectrum (in methylene chloride) inter alia the following characteristic bands: $2.74\mu$ (hydroxyl); 5.70 and $5.78\mu$ (acetate, formate and 20-ketone); 5.91 and $6.14\mu$ ($\Delta^4$-3-ketone); $8.11\mu$ (acetate) and $8.49\mu$ (formate). Ultraviolet spectrum in absolute alcohol: $\lambda_{max.} = 234 m\mu$, $\epsilon = 8,100$.

To hydrolyze the 11$\alpha$-formyloxy group selectively 1 g. of the 6$\beta$-fluoro compound obtained as described above is dissolved in 40 ml. of benzene and adsorbed on 30 g. of alumina (activity II, neutral). Within 4 hours the alumina column is washed with a total of 200 ml. of benzene, 200 ml. of a 19:1-mixture of benzene and ethyl acetate, without however obtaining any substantial eluate at all. The column is then washed with 800 ml. of ethyl acetate; after evaporation under vacuum there is obtained crude $\Delta^4$ - 3:20-dioxo-6$\beta$-fluoro-11$\alpha$:17$\alpha$-dihydroxy-16$\alpha$-methyl-21-acetoxypregnene which is dissolved in 10 ml. of pyridine and mixed with 1 ml. of methaneulfonyl chloride while being stirred and cooled with an ice+sodium chloride mixture. The batch is kept for 6 hours at 0° C. and then poured into 40 ml. of ice-cold N-hydrochloric acid and extracted three times with a 2:1-mixture of ethyl acetate+ether. The organic solutions are washed with 25 ml. of ice-cold N-hydrochloric acid, 15 ml. of 0.5 N-sodium carbonate solution and with water, dried and evaporated at 30° C. under reduced pressure. The resulting crude $\Delta^4$ - 3:20 - dioxo-6$\beta$-fluoro-11$\alpha$-mesyloxy-16$\alpha$-methyl - 17$\alpha$-hydroxy-20-oxo-21-acetoxypregnene is first dried for 30 minutes in a high vacuum and then stirred at a bath temperature of 120° C. under nitrogen for 2 hours with 1 g. of lithium carbonate and 15 ml. of a solution of 10% strength of lithium chloride in dimethylformamide, then cooled, filtered off, rinsed with methylene chloride, and the filtrate is repeatedly extracted with water. The aqueous solutions are agitated with methylene chloride, and the organic solutions are combined, dried and evaporated under vacuum. To remove the last remnants of dimethylformamide the product is dissolved in xylene and once more evaporated under a water-jet vacuum. The residue is chromatographed on 30 g. of silica gel containing 15% of water. The residue of the fractions eluted with a 4:1-mixture of benzene+ethyl acetate (which contain $\Delta^{4:9(11)}$-3:20-dioxo-6$\beta$-fluoro-16$\alpha$-methyl-17$\alpha$-hydroxy-21-acetoxypregnadiene; 180 mg.) is dissolved in 20 ml. of chloroform. A slow current of hydrochloric acid is passed through this solution for 20 minutes while cooling with ice, and the mixture is then left to itself for 2½ hours at 0° C., then diluted with methylene chloride and washed with water, dilute sodium bicarbonate solution and again with water, dried and evaporated under vacuum. The residue is chromatographed on 8 g. of silica gel containing 15% of water.

The fractions eluted with a 9:1-mixture of benzene and ethyl acetate yield on recrystallization from methanol with the aid of Carboraffin 65 mg. of crude $\Delta^{4:9(11)}$-3:20-dioxo - 6$\alpha$ - fluoro-16$\alpha$-methyl-17$\alpha$hydroxyl-21-acetoxy-pregnadiene melting at 195–197° C. The pure product melts at 212–213° C. and displays in the infrared spectrum in methylene chloride, inter alia, the following characteristic bands: $2.74\mu$ (hydroxyl); $5.70\mu$ (acetate); $5.76\mu$ (20-ketone); $5.94\mu$ and $6.14\mu$ ($\Delta^4$-3-ketone) and $8.12\mu$ (acetate).

Example 4

A solution of 1.0 g. of $\Delta^{4:6:9(11)}$-3:20-dioxo-16$\alpha$-methyl-17$\alpha$-hydroxy-21-acetoxypregnatriene in 150 ml. of absolute alcohol is mixed with 7.5 ml. of water, 10 g. of zinc dust and 3 ml. of glacial acetic acid and the batch is stirred for 30 minutes at 60° C., and then processed as described in Example 3, to yield 800 mg. of crude, oily $\Delta^{5:9(11)}$-3:20-dioxo - 16$\alpha$ - methyl-17$\alpha$-hydroxy-21-acetoxypregnadiene.

680 mg. of the above product in 15 ml. of glacial acetic acid are heated for 30 minutes at 100° C.; the solution is then evaporated in a water-jet vacuum, the resulting crude product is taken up in methylene chloride, the solution is washed neutral, dried and once more evaporated, to yield 675 mg. of a crystalline residue which, after recrystallization from methanol, yields pure $\Delta^{4:9(11)}$-3:20-dioxo - 16$\alpha$ - methyl-7$\alpha$-hydroxy-21-acetoxypregnadiene melting at 202–204° C. Optical rotation $[\alpha]_D = +93°$ Ultraviolet maximum at 239 m$\mu$ ($\epsilon = 17,300$). Infrared bands, inter alia, at 2.76, 5.70, 5.76, 5.98, 6.18, 8.14, 9.38, 9.57 and $9.83\mu$.

Example 5

6.0 g. of crude 2:4-dibromo-3:20-dioxo-11$\alpha$:21-diacetoxy-16$\alpha$-methyl-17$\alpha$-hydroxyallopregnane are added to a solution of 12.0 g. of anhydrous lithium bromide in 120 ml. of dimethylformamide and the mixture is stirred for 18 hours at 60° C. then poured into 1200 ml. of saturated sodium chloride solution, stirred for 30 minutes, and the precipitate is suctioned off and thoroughly washed with water. The moist filter cake is dissolved in methylene chloride, the solution is washed with water, dried, and evaporated, to yield 4.37 g. of an amorphous residue which contains about 60% of $\Delta^{4:6}$-3-ketone as revealed by its ultraviolet spectrum ($\lambda_{max.}$ 282, $\epsilon = 13,800$). The crude product is purified by chromatography on silica gel containing 15% of water. A 4:1-mixture of benzene and ethyl acetate elutes at first 2.3 g. of $\Delta^{4:6}$-3:20-dioxo-11$\alpha$:21-diacetoxy-16$\alpha$-methyl - 17$\alpha$ - hydroxypregnadiene. After another purification on alumina and crystallization from acetone+ether the product melts at 157–158° C. Optical rotation $[\alpha]_D^{25} = +51°$ (in chloroform). Ultraviolet maximum at 282 m$\mu$ ($\epsilon = 22,800$). Infrared bands, inter alia, at 2.74, 5.70, 5.76, 6.00, 6.13, 6.29, 8.12, 9.08, 9.25 and $11.16\mu$.

The following fractions (1.1 g.), eluted with the same solvent mixture, display an absorption maximum at 245 m$\mu$ ($\epsilon = $ about 12,000) and contain $\Delta^4$-2-bromo-3:20-dioxo-11$\alpha$:21-diacetoxy-16$\alpha$-methyl - 17$\alpha$ - hydroxypregnene.

The dibromide used as starting material is prepared in the following manner:

In the course of 10 minutes 45 ml. of a 2.8 N-solution of bromide in glacial acetic acid are stirred dropwise at 12–16° C. into a mixture of 13.9 g. of 3:20-dioxo-11$\alpha$:21-diacetoxy-16$\alpha$-methyl - 17$\alpha$ - hydroxyallopregnane, 150 ml. of glacial acetic acid and 14.2 ml. of a 4.2 N-solution of hydrogen bromide in glacial acetic acid. 10 minutes later the batch is poured into 1.8 liters of water, suctioned off and the filter cake is washed with water and dried in a water-jet vacuum over phosphorus pentoxide, to yield 18.21 g. of 2:4-dibromo-3:20-dioxo-11$\alpha$:21-diacetoxy-16α-methyl-17α-hydroxyallopregnane in the form of a faintly beige colored powder.

*Example 6*

A solution of 20 g. of anhydrous lithium bromide in 200 ml. of dimethylformamide is mixed with 10.0 g. of crystalline crude 2:4-dibromo-3:20-dioxo-11α-formyloxy-16α-methyl-17α-hydroxy-21-acetoxyallopregnane, and the reaction mixture is stirred for 16 hours at 60° C. under nitrogen. The mixture is then poured into 2 liters of a saturated sodium chloride solution, the precipitate is suctioned off, thoroughly washed with water, and the moist residue is taken up in methylene chloride. The solution is washed with water, dried and evaporated, to yield 7.62 g. of crude product which displays in the ultraviolet spectrum a maximum of 282 m$\mu$ ($\epsilon$=13,500). The crude product is purified by chromatography on silica gel containing 15% of water. A 4:1-mixture of benzene and ethyl acetate at first elutes a compound (600 mg.) which does not absorb in the ultraviolet spectrum, then 3.2 g. of $\Delta^{4:6}$-3:20 - dioxo - 11α - formyloxy-16α-methyl-17α-hydroxy-21-acetoxypregnadiene which melts at 183–184° C. after recrystallization from acetone+ether. Optical rotation $[\alpha]_D^{25}$=+63.5° C. (in chloroform). Ultraviolet maximum at 283 m$\mu$ ($\epsilon$=22,800). Infrared bands, inter alia, at 2.73, 5.70, 5.78, 6.00, 6.13, 6.28, 8.12, 8.47, 9.58 and 11.16$\mu$.

The following fractions eluted with a 4:1-mixture of benzene and ethyl acetate contain about 400 mg. of a further crystalline substance which displays an absorption maximum at 247 m$\mu$.

Finally, ethyl acetate elutes 2.0 g. of substance which, according to its ultraviolet and infrared spectra, contains about 50% of $\Delta^{4:6}$-3:20-dioxo-11α:17α-dihydroxy-16α-methyl-21-acetoxypregnadiene. The 11α-formyl group is hydrolyzed during the dehydrobromination. By formylation of the crude product and purification by chromatography on silica gel more of the $\Delta^{4:6}$-diene-11α-formate (melting at 183–184° C.) can be obtained.

The dibromide used as starting material is prepared as follows:

A mixture of 815 ml. acetic anhydride and 345 ml. of anhydrous formic acid is prepared with cooling and on the following day 250 g. of 3:20-dioxo-11α:17α-dihydroxy-16α-methyl-21-acetoxyallopregnane are stirred in. After 24 hours the whole is gradually mixed, while being vigorously stirred, with 2 kg. of ice and then with 400 ml. of water. After 30 minutes the batch is suction-filtered, the filter cake is washed with water and dissolved in methylene chloride. The separated water is alkalinized with potassium carbonate, the whole is vigorously agitated, the organic phase separated, and the aqueous phase is extracted with methylene chloride. The combined methylene chloride solutions are dried, considerably concentrated in a water-jet vacuum and mixed with ether, whereupon crystallization sets in. After having filtered off the crystals and washed them with cold ether, there are obtained 224 g. of 3:20-dioxo-11α-formyloxy-16α-methyl-17α-hydroxy - 21 - acetoxyallopregnane melting at 210–211.5° C. Optical rotation $[\alpha]_D^{25}$=+21.4° (c.=1.006 in chloroform). Infrared spectrum in methylene chloride: 2.73$\mu$ (hydroxyl); 5.70$\mu$, 5.77$\mu$ (inflextion) and 5.81$\mu$ (acetate, formate and ketones); 8.13$\mu$ (acetate) and 8.42$\mu$ (formate).

36 ml. of a 3.5 N-solution of bromine in glacial acetic acid are added within 10 minutes to a mixture of 13.45 g. of 3:20-dioxo-11α-formyloxy-16α-methyl-17α-hydroxy-21-acetoxyallopregnane, 150 ml. of glacial acetic acid and 14.2 ml. of a 4.2 N-solution of hydrogen bromide in glacial acetic acid. 10 minutes later the whole is poured into 1.8 liters of water, suction-filtered and washed with 1 liter of water. The filter residue is dried in a water-jet vacuum over phosphorus pentoxide and yields 16.9 g. of 2:4-dibromo - 3:20 - dioxo - 11α-formyloxy-16α-methyl-17α-hydroxy-21-acetoxyallopregnane in the form of a light-grey powder which melts at 193–195.5° C. with decomposition after solution and reprecipitation from a methylene chloride+ether mixture. Optical rotation $[\alpha]_D^{25}$=+23.1° (c.=1.072 in chloroform). Infrared spectrum in methylene chloride: 2.74$\mu$ (hydroxyl); 5.70$\mu$ and 5.78$\mu$ (acetate, formate and ketones); 8.13$\mu$ (acetate) and 8.51$\mu$ (formate).

*Example 7*

A mixture of 100 mg. of 2:4-dibromo-3:20-dioxo-11α:21-diacetoxy-16α-methyl-17α-hydroxyallopregnane and 2.0 ml. of a solution of 10% strength of lithium bromide in dimethylformamide is kept for 5 days at 20–25° C., then poured into 20 ml. of a saturated sodium chloride solution and the product (86 mg.) is filtered off; according to its ultraviolet spectrum (282 m$\mu$, $\epsilon$=6,500) it contains about 30% of $\Delta^{4:6}$-3:20-dioxo-11α:21-diacetoxy-16α-methyl-17α-hydroxypregnadiene.

*Example 8*

100 mg. of 2:4-dibromo-3:20-dioxo-11α:21-diacetoxy-16α-methyl-17α-hydroxyallopregnane in 2.0 ml. of dimethylacetamide are heated for 3 hours at 100° C. The reaction mixture is then poured into water, filtered, the residue is taken up in methylene chloride, and the solution is dried and evaporated. The crude product (41 mg.=56% of theory) displays in the ultraviolet spectrum a maximum at 283 m$\mu$ ($\epsilon$=13,000) with a shoulder at about 243 m$\mu$ ($\epsilon$ about 9,000) which corresponds to a content of about 40% of $\Delta^{1:4}$-ketone and about 60% of $\Delta^{4:6}$-3,20-dioxo-11α:21-diacetoxy-16α-methyl-17α-hydroxypregnadiene.

When the reaction is performed for 10 hours at 65° C., a crude product results which contains about 70% of 4:6-diene and only a little $\Delta^{1:4}$-3-ketone.

*Example 9*

2.0 g. of a crude dibromide, obtained by brominating 3-oxo-17β-propionyloxy-5α-androstane, are heated in 40 ml. of a solution of 10% strength of lithium chloride in dimethylformamide for 24 hours at 60° C. The reaction mixture is then poured into 400 ml. of water and repeatedly extracted with benzene. The extracts are washed with water, dried and then evaporated in a water-jet vacuum. Chromatography of the crude product—which displays in the ultraviolet spectrum a maximum at 282 m$\mu$ ($\epsilon$=13,100) on 60 g. of alumina furnishes 0.72 g. of 6-dehydrotestosterone propionate which melts at 135–136° C., after crystallization from methanol. Optical rotation $[\alpha]_D$=+29° (in chloroform). Ultraviolet maximum at 283 m$\mu$ ($\epsilon$=26,600).

*Example 10*

A cooled solution of 5.0 g. of anhydrous lithium bromide in 50 ml. of anhydrous dimethylformamide is mixed with 2.5 g. of 2:4-dibromo-3:20-dioxo-17α-hydroxy-21-acetoxy-allopregnane; the batch is stirred for 16 hours at 65° C., then poured into 500 ml. of a saturated sodium chloride solution and the precipitate is filtered off. The residue is dissolved in benzene, the solution is dried, filtered through 25 g. of alumina and washed with 1 liter of benzene. The benzene solution is evaporated and after trituration with an ether+ethyl acetate mixture there are obtained 1.1 g. of $\Delta^{4:6}$-3:20-dioxo-17α-hydroxy-21-acetoxypregnadiene which after another recrystallization melts at 220–221° C.

*Example 11*

A solution of 26.5 g. of lithium bromide in 265 ml. of dimethylformamide is mixed with 13.24 g. of 2:4-dibromo-3:20 - dioxo - 11α-dihydroxy-16α-methyl-21-acetoxy-allopregnane, and the reaction mixture is stirred for 45 hours at 60° C. under nitrogen. The cooled, dark solution is poured into 2.5 liters of a saturated sodium chloride solution, and the product is filtered off, washed with water and dissolved in methylene chloride. The solution is again washed with water, dried and evaporated. The resulting crude $\Delta^{4:6}$-3:20-dioxo-11α:17α-dihydroxy-16α-methyl-21-acetoxypregnadiene (9.20 g.; $\lambda_{max.}$=283 mμ, ε=12,000) is dissolved in a mixture which has been prepared 25 hours earlier of 53 ml. of acetic anhydride and 22 ml. of anhydrous formic acid and the solution is kept overnight at room temperature, then poured into 750 ml. of ice water, stirred for ½ hour, and the precipitated crude product is suctioned off, washed with water and dissolved in methylene chloride. The methylene chloride solution is washed with dilute sodium bicarbonate solution and with water, dried and evaporated. The residue is then dissolved in 500 ml. of acetone, 10 g. of animal carbon are added, the whole is filtered, washed with acetone and once more evaporated in a water-jet vacuum, to yield 8.5 g. of a residue which is purified by chromatography on silica gel as described in Example 2. The fractions eluted with a 4:1-mixture of benzene and ethyl acetate yield after crystallization from acetone+ether 3.8 g. of $\Delta^{4:6}$-3:20-dioxo-11α - formyloxy - 16α - methyl - 17α-hydroxy-21-acetoxypregnadiene melting at 183–184° C.

The dibromide used as starting material is obtained by bromination of 3:20-dioxo-11α:17α-dihydroxy-16α-methyl-21-acetoxyallopregnane as described in Example 1.

*Example 12*

A solution of 20 g. of lithium bromide in 200 ml. of dimethylformamide is mixed with 10 g. of 2:4-dibromo-3:20 - dioxo - 11α - tosyloxy-16α-methyl-17α-hydroxy-21-acetoxyallopregnane, and the reaction mixture is stirred for 40 hours at 60° C. under nitrogen and then processed as described in Example 5. The crude product is purified by chromatography on silica gel. A 4:1 mixture of benzene and ethyl acetate elutes 2.6 g. of $\Delta^{4:6:9(11)}$-3:20-dioxo-16α - methyl - 17α-hydroxy-21-acetoxypregnatriene which melts at 187–188° C. after crystallization from methylene chloride+acetone+ether. Optical rotation $[\alpha]_D$=—30°. Ultraviolet spectrum: $\lambda_{max.}$=284 mμ (ε=20,400).

The tosylate dibromide used as starting material is obtained by brominating 3:20-dioxo-11α-tosyloxy-16α-methyl-17α-hydroxy-21-acetoxyallopregnane in methylene chloride+glacial acetic acid with bromine at room temperature.

What is claimed is:
1. Process for the manufacture of 3-oxygenated steroids selected from the group consisting of those of the cholestane, stigmastane, pregnane and androstane series wherein a $\Delta^{4:6}$-3-oxo-steroid is treated with zinc in a member selected from the group consisting of a monovalent and a divalent lower aliphatic alcohol and a mixture of such alcohol with about 2 to 10% of a lower aliphatic carboxylic acid and there is thus formed a $\Delta^5$-3-oxo-steroid.

2. Process as claimed in claim 1, wherein zinc activated by a treatment with an acid is used.

3. Process as claimed in claim 2, wherein the zinc is activated by the addition of small quantities of a lower alkanoic acid to the reaction medium.

4. Process as claimed in claim 1, wherein the reaction is carried out in a lower alkanol.

5. Process as claimed in claim 1, wherein the reduction is carried out in the presence of 1–5% of water.

6. Process according to claim 1, wherein the $\Delta^5$-3-oxo-steroid obtained is reduced with a complex light metal hydride to a $\Delta^5$-3-hydroxy-steroid.

7. Process as claimed in claim 6 wherein there is used sodium boronhydride.

8. Process according to claim 1, wherein the $\Delta^5$-3-oxo-steroid obtained is isomerized by treatment with an acid to the corresponding $\Delta^4$-3-keto-steroid.

9. $\Delta^5$ - 3:20 - dioxo-11α:21-diacyloxy-16α-methyl-17α-hydroxy-pregnene in which each acyloxy group is derived from a lower alkanoic acid.

10. $\Delta^5$ - 3:20 - dioxo - 11α-formyloxy-16α-methyl-17α-hydroxy-21-acetoxy-pregnene.

11. $\Delta^{5:9(11)}$ - 3:20 - dioxo-16α-methyl-17α-hydroxy-21-acetoxy-pregnadiene.

12. $\Delta^5$ - 3β:17α - dihydroxy-11α-formyloxy-16α-methyl-20-oxo-21-acetoxy-pregnene.

13. $\Delta^{5:9(11)}$ - 3β:17α - dihydroxy-16α-methyl-20-oxo-21-acetoxy-pregnadiene.

References Cited by the Examiner
UNITED STATES PATENTS

| | | | |
|---|---|---|---|
| 2,891,079 | 6/1959 | Dodson et al. | 260—397.4 |
| 3,010,958 | 11/1961 | Rausser et al. | 260—239.55 |
| 3,036,098 | 5/1962 | Bowers et al. | 260—397.45 |
| 3,054,725 | 9/1962 | Ilavsky et al. | 195—51 |
| 3,055,922 | 9/1962 | Levinson | 260—397.45 |
| 3,082,224 | 3/1963 | Weinstock | 260—397.45 |
| 3,097,199 | 7/1963 | Bowers | 260—239.55 |

LEWIS GOTTS, *Primary Examiner.*